June 12, 1956 F. D. WALDHAUER 2,750,456

SEMI-CONDUCTOR DIRECT CURRENT STABILIZATION CIRCUIT

Filed Nov. 15, 1952

INVENTOR.

FREDERICK D. WALDHAUER

BY H. W. Newton

ATTORNEY

United States Patent Office 2,750,456

Patented June 12, 1956

2,750,456

SEMI-CONDUCTOR DIRECT CURRENT STABILIZATION CIRCUIT

Frederick D. Waldhauer, Haddonfield, N. J., assignor to Radio Corporation of America, a corporation of Delaware Application November 15, 1952, Serial No. 320,765

7 Claims. (Cl. 179—171)

This invention relates generally to semi-conductor signal circuits and particularly to semi-conductor signal amplifier circuits of the feedback type.

The circuit is described herein with particular reference to its use as an amplifier and as utilizing a semi-conductor device comprising a semi-conductive body and a plurality of electrodes associated therewith. One form of such an assembly of a semi-conductor device and its electrodes is called a transistor. A better understanding of the invention may be obtained and the description of the invention may be simplified by first considering some of the basic facts and principles and explaining presently used terminology relating to semi-conductors.

In semi-conductive materials electrical currents, according to presently accepted theory, are carried by electrons designated as excess electrons or by holes, which result in effect from a deficiency in electrons. According to present theory, a hole may be viewed as a carrier of positive electric charges and the electron as a carrier of negative electric charges. Semi-conductor materials have been classified into two conductivity types depending on whether the mobile charges normally present in excess in the material under equilibrium conditions are electrons or holes. These conductivity types are specifically N type which passes current easily when the semi-conductive material is negative with respect to a rectifying connection, thereto, and P type which passes current easily when the semi-conductive material is positive with respect to such a connection.

Two classes of semi-conductor devices have been developed which have been termed the point contact transistor and the junction transistor. As the name implies, the point contact transistor comprises a semi-conductive body having two or more small area electrodes, the collector electrode and the emitter electrode, in high resistance or rectifying contact therewith and another electrode, the base or control electrode, in low-resistance or ohmic contact therewith. The semi-conductive body can, of course, be of N type or of P type material and may, for example, be of germanium or silicon crystal. The junction type of transistor comprises a semi-conductive body having alternate zones of N and P type material, adjacent zones being separated by a junction or barrier. Electrodes are placed in low-resistance contact with the discrete zones of the material.

The utilization of a semi-conductor device in an amplifier circuit, which provides a self-biasing transistor arrangement utilizing a single source of energizing potential, is disclosed in U. S. Patent No. 2,517,960, granted to H. L. Barney et al., August 8, 1950, for Self-Biased Solid Amplifier. The patentee describes a self-biasing arrangement wherein it is possible to bias the base electrode with respect to the other electrodes. However, it has been found that known self-biasing circuits do not adapt themselves adequately to transistors of varying operating characteristics. It has been found that both the dynamic and static characteristics of transistors vary appreciably from one unit to another even though effort is directed to making them identical with each other. Accordingly, a circuit which has been adjusted to operate satisfactorily with one transistor may be found to be less satisfactory or even inoperative with a second transistor, due to the difference in transistor characteristics.

An object of this invention is to provide a stable and efficient semi-conductor circuit, and in more particularity to provide such a circuit suitable for use as an amplifier.

It is a further object of the invention to provide an improved semi-conductor amplifier circuit which enables ready and satisfactory operation with semi-conductor devices having different operating characteristics.

Another object of the invention is to provide, in a transistor circuit which includes fixed passive elements, an amount of transistor base electrode bias current which is variable in accordance with variations in the characteristics of the transistor, and which varies in a direction to effect stabilization of the circuit operation.

A further object of this invention is to provide a direct current stabilizing amplifier circuit which enables the utilization therein of semi-conductor devices having dissimilar characteristics and in which alternating current degeneration may be minimized.

In accordance with the present invention, there is provided a semi-conductor device comprising a semi-conductive body having a base electrode, a collector electrode and an emitter electrode in engagement therewith. In the illustrated embodiment, an input signal is coupled between the base electrode and the emitter electrode, and an output signal is derived from an output impedance which is connected between the collector electrode and the emitter electrode. Direct current stabilization is provided by a direct current degenerative connection comprising a direct current conductive impedance means connected directly between the collector electrode and the base electrode. In this manner the base electrode current of an individual semi-conductor device is determined primarily by the value of the impedance means and collector electrode voltage.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

Figure 1:
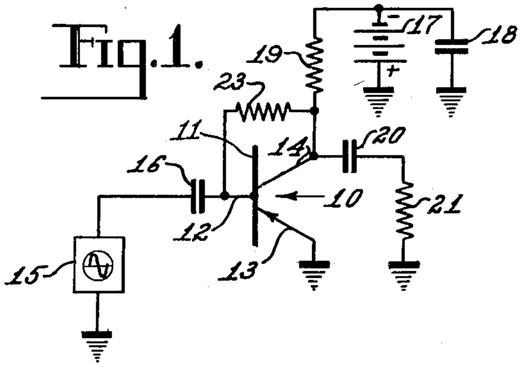
Figure 1 is a schematic circuit diagram of a semi-conductor circuit illustrating one embodiment of the present invention.

Referring now to the drawing wherein like reference characters are used to designate like elements throughout the several figures and particularly to the amplifier circuit shown in Figure 1, a transistor 10 is provided as the amplifier device. This may be of the point contact type or of the junction type. It should be understood, however, that the transistor 10 should be of the type having a signal phase reversal between its collector and base electrodes. Such a transistor will also exhibit a current gain of less than unity as defined by the ratio of collector current increments to emitter current increments. It comprises a semi-conductive body 11 which may be of either conductivity type, but in Figure 1 is assumed to be of P-N-P junction type, and it further includes a base electrode 12, an emitter electrode 13 and collector electrode 14.

Input signals from a signal source represented by the rectangle 15 are impressed on the base electrode 12 through a coupling capacitor 16. The emitter electrode 13 is connected directly to a point of fixed reference potential such as ground as is one terminal of the signal source 15. Energizing potentials may be provided from any convenient source which, by way of illustration, is shown as a battery 17 having the positive terminal connected directly to ground, and which is bypassed at signal frequencies by a capacitor 18. The negative terminal of the battery 17 is connected to the collector electrode 14 through a collector load impedance illustrated as a resistor 19, thereby providing a bias in the reverse direction i. e., in the difficult current-flow direction between the collector electrode and the base electrode and a bias in the forward direction, i. e., in the direction of easy current-flow, between the emitter electrode and the base electrode. An output circuit is provided by means of a capacitor 20 and an output load resistor 21 which are connected in series arrangement between the collector electrode 14 and ground. Stabilization for the circuit is provided by a stabilizing impedance, which by way of illustration, is shown as a stabilizing resistor 23 connected between the collector electrode 14 and the base electrode 12.

Under static conditions, i. e. in the absence of signal, certain currents flow in the circuit of Figure 1 which for later convenience will now be defined in accordance with usual terminology. The larger current passes through the emitter electrode 13. Part of this current goes through the body 11 to the collector 14 and through load resistor 19 and battery 17 back to the emitter. This is called the collector current. A further part of the emitter current passes through a portion of the body 11 to the base electrode 12 and through the resistor 23, load resistor 19 and battery 17 back to the emitter. Such current is called the base current. Further, the voltage drop existing across the body 11 between emitter electrode 13 and collector electrode 14 is called the collector voltage. The emitter current is regarded as the sum of the collector current and the base current. The magnitude of the collector current will depend upon the transistor characteristics and upon the magnitude of the base current flowing in the connection including the stabilizing resistor 23 between the base electrode 12 and the collector electrode 14.

Figure 4A:
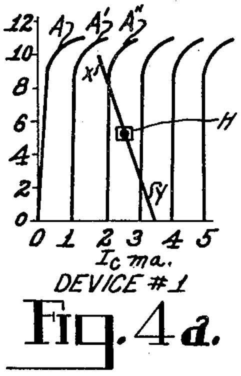

The manner of the advantageous operation of the invention, as now understood, will be explained in reference to the graphs in Fig. 4*a*, 4*b* and 4*c* which represent respectively the operating characteristics of three semi-conductor devices, e. g. transistors, when used in the circuit of Fig. 1. Fig. 4*a* is indicated on the drawing as employing "Device No. 1." Figs. 4*b* and 4*c* are indicated as employing respectively "Device No. 2" and "Device No. 3," the circuit being unchanged except for the substitution of one semi-conductor device for another.

Fig. 4*a* indicates on the ordinate, typical values, 0 to −10 volts, of collector voltage and further shows by a curve X—Y different values of collector current corresponding to the different values of collector voltage. Fig. 4*a* also shows curves A, A′, A″, etc., corresponding to typical values 50 microamperes, 100 microamperes, etc. of base current concomitant with indicated values of collector current, the symbol at H denoting a collector voltage of about 5 volts and a collector current of about 2½ ma. (milliamperes). There is thus established in the absence of signal an operating point on the X—Y curve such that an impressed signal will effect operation with a desired value of collector voltage and on a substantially linear portion of the curve X—Y extending on each side of the point H.

Figure 4B:
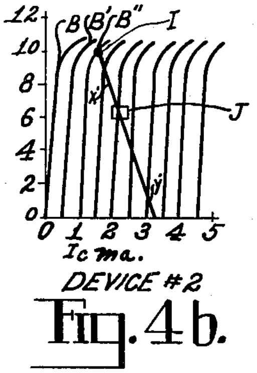

Figure 4*b* shows that in the use of the invention and with precisely the same arrangement and values of other circuit elements, but with a different transistor, somewhat different values of collector voltage, to wit, something over 6 volts, and of collector current, to wit, about 2 ma. may exist causing the operating point to be as indicated by the symbol J on the X—Y line. The point J also denotes an appropriate value of collector voltage and lies on a substantially linear portion of the X—Y line, such that satisfactory operation results when an impressed signal provides a collector current output varying on opposite sides of the point J.

Figure 4C:
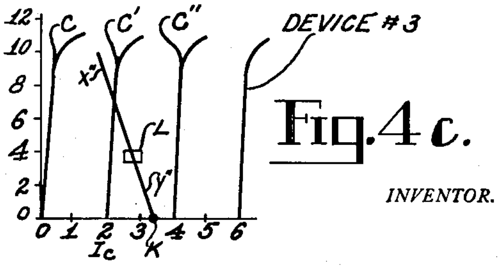

Figure 4*c* shows that in the use of the invention and with precisely the same arrangement and values of other circuit elements as in Figures 4*a* and 4*b*, but with a still different transistor indicated as "Device No. 3," still different values of collector voltage, to wit, somewhat less than 4 volts, and of collector current, to wit, about 3 ma., may exist causing the operating point to fall at the point L on the X—Y line. However, the point L denotes an appropriate value of collector voltage and is again on a substantially linear portion of the X—Y line, such that satisfactory operation results when an impressed signal provides a collector current output varying on opposite sides of the point L.

Contrast now what may occur when the transistor of Figure 4*b* or that of Figure 4*c* is substituted in a known circuit, i. e. one not employing my invention, for the transistor of Figure 4*a*. As indicated at I in Figure 4*b* the operating point may no longer be at or close to the point J but may fall on an unduly decreased current, increased voltage, non-linear portion of the curve X—Y resulting in unacceptable distortion—and as indicated at K in Figure 4*c* the operating point may no longer be at or close to the point L but may fall on an unduly increased current, decreased voltage, non-linear portion of the curve X—Y also resulting in unacceptable distortion.

By further reference to Figures 4*a*, 4*b* and 4*c*, it will be noted that with the transistor of Figure 4*a* and, for example, concomitant with a collector current of 2 ma., a base current of about 150 microamperes is indicated as flowing through the resistors 23 and 19; that with the transistor of Figure 4*b* and concomitant with the same emitter current of 2 ma., a base current of about 250 microamperes is indicated as flowing through resistors 23 and 19; and that with the transistor of Figure 4*c* and concomitant with the same emitter current of 2 ma., a base current of about 100 microamperes is indicated as flowing through the resistors 23 and 19.

The present invention establishes automatically the proper value of base current to tend to hold constant the values of collector voltage and current. If the transistor characterized by the graph of Figure 4*b* is substituted for the transistor characterized by the graph of Figure 4*a*, the collector current will tend to be too small in value unless the base current is increased. However, a small collector current will produce a small voltage drop across the collector load resistor 19 thereby increasing the voltage, in a negative direction, at the collector electrode. The voltage at the collector electrode acts as a bias voltage applied to the base electrode through the compensating resistor 23. Accordingly, the larger voltage drop effective on the base electrode causes the needed larger base bias current. This larger base bias current is accompanied by a larger collector current, as can be seen by reference to any one of the graphs of Figures 4*a*, 4*b* or 4*c*. A larger collector current passing through the resistor 19 will in turn lessen the negative voltage at the collector electrode, which it can be seen will cause a reduction of the initial effect on base bias current. Thus the collector current will increase until a value is reached such that a sufficient base bias current is provided to maintain that value of collector current.

If on the other hand, a transistor characterized by the graph of Figure 4*c* is substituted for the transistor characterized by the graph of Figure 4*a*, the collector current will tend to be too large unless the base current is decreased. However, a large collector current will produce a large voltage drop across the collector load resistor 19 thereby decreasing the voltage in a negative direction at the collector electrode. As above discussed, the voltage at the collector electrode acts as a bias voltage which is applied to the base electrode through the compensating resistor 23. Accordingly the smaller voltage drop effective on the base electrode causes the needed smaller base bias current. This smaller base bias current is accompanied by a corresponding smaller collector current as can be seen by reference to the graph of Figure 4*c*. This smaller collector current passing through the resistor 19 will in turn increase the negative voltage at the collector electrode which, as can be seen, will cause a reduction of the initial effect on the base bias current. Accordingly, in this instance the collector current is reduced to a value such that a base current is provided which is of the proper value to maintain that value of collector current.

It has been found in utilizing an amplifier circuit as illustrated by the schematic circuit diagram of Figure 1 wherein the collector electrode load resistor 19 has a resistance of 7,000 ohms, the stabilizing resistor 23 has a resistance of 40,000 ohms and the battery 17 provides a direct current potential of the order of 22½ volts, that transistors having the widely varying characteristics as illustrated by the graphs in Figures 4*a*, 4*b* and 4*c* can be satisfactorily used in the circuit without circuit adjustment. There was a slight variation in the static operating point as shown by the symbol H located on the D.-C. load line X—Y in Figure 4*a*, the rectangle J located on the load line X′—Y′ in Figure 4*b* and the rectangle L located on the load line X″—Y″ in Figure 4*c*. However, in each of these instances the shift in operating point was not of such a magnitude so as to cause nonlinear operation of the resulting circuit. The circuit for which values are given above was used with a capacitor 20 of 20 microfarads and with a resistor 21 of 500 ohms.

It is noted that maximum stabilization is provided by this invention when the collector electrode load resistance illustrated as resistor 19 in Figure 1 is large relative to the effective direct current resistance of the collector to emitter path of the transistor, this latter resistance being defined as the quotient of the direct collector voltage divided by the direct collector current. Thus, stabilization is increased with an increase in the ratio of the direct voltage across the resistor 19 to the voltage at the collector electrode 14. This effective direct current resistance of the transistor, which may vary according to the operating point, may be determined for any given operating point by dividing the direct collector voltage by the direct collector current. In the graph of Figure 4*b*, for example, the effective direct current resistance at the operating point J would be approximately 3000 ohms. This effective direct current resistance is to be contrasted to the internal generator resistance (i. e., internal output resistance) of the transistor which in a typical case such as in Figure 4*b* may be 30,000 ohms. Moreover, the resistance of the collector electrode load impedance is small relative to the resistance of the stabilizing impedance element which is represented by the resistor 23 connected between the collector electrode 14 and the base electrode 12. When the resistance values of these elements are thus selected, current variations which occur in the collector electrode circuit offer a maximum correction by providing a relatively large stabilizing or correcting voltage variation, which will operate to vary the base electrode bias current.

It is, of course, understood that the polarity of the battery 17 is merely for the purpose of illustration and is in the proper direction for an N-type point contact transistor or a P-N-P junction transistor. If another type transistor i. e. a P-type point contact transistor or N-P-N junction transistor were used, the polarity of the battery 17 would then be reversed from that shown.

Figure 2:
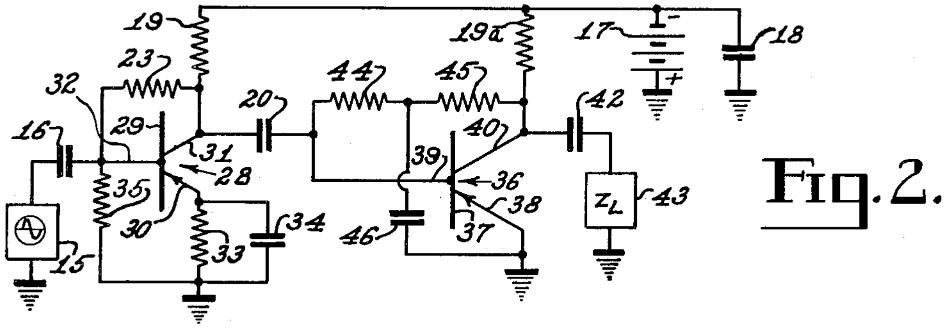
Figure 2 is a schematic circuit diagram of two cascaded semi-conductor amplifiers illustrating a further embodiment of the present invention.

Referring now to Figure 2, there is shown a schematic circuit diagram of a pair of semi-conductor amplifiers connected in cascade and illustrating a modification of the invention shown in Figure 1. In this embodiment, a transistor 28 is provided which comprises a semiconductive body 29 such as a germanium crystal of N or P type conductivity if the transistor 28 is a point contact transistor, or which may be a similar semiconductive body including alternate zones of opposite conductivity type if the transistor 28 is a junction transistor. However, the connection of the battery 17 in Figure 2, as in Figure 1, assumes that the transistor 29 is of the point contact N-type or the P-N-P junction type.

An emitter electrode 30, a collector electrode 31 and a base electrode 32 are each in contact with the semiconductive body 29. An input circuit 15 and a coupling capacitor 16 are connected between the base electrode 32 and ground. A collector load impedance element 19 is connected between the collector electrode 31 and battery 17, which is bypassed at signal frequencies by a capacitor 18 connected in shunt with the battery 17. A stabilizing element illustrated as a resistor 23 is connected between the collector electrode 31 and the base electrode 32.

The circuit as thus far described, is substantially identical to the circuit described in connection with Figure 1. However, additional biasing elements have been provided which are illustrated as an emitter electrode bias resistor 33 and a base electrode resistor 35, which are connected respectively between the emitter electrode 30 and ground, and between the base electrode 32 and ground. A bypass capacitor 34 is connected in shunt with the biasing resistor 33 to prevent alternating current degeneration.

It can be seen that if the stabilization resistor 23 is made much smaller than the values above referred to, a considerably larger base current will be provided and, therefore, by reference to the graphs shown in Figures 4*a*, 4*b* and 4*c*, it can be seen that a much larger collector current will be allowed to flow in the circuit. However, a large collector current will, in turn, develop a voltage across the emitter electrode bias resistor 33. This voltage which is developed across the resistor 33 will be poled in such a direction and applied between the base electrode 32 and the emitter electrode 30 to reduce the excess base current which was produced due to the low value of the stabilization resistor 23. It is, therefore, readily seen that the operation of the stabilization resistor 23 and the emitter electrode bias resistor 33 are opposed to effectively produce a direct current operating point which will be substantially invariable even with transistors having widely varying characteristics.

A comparison of the effectiveness of these circuits can be had by reference to the following tables which are a tabulation of the results obtained with some twenty-six transistors of the P-N-P junction type. These were tested in each of three circuits. The first circuit was without stabilization, the second circuit contained the stabilizing circuit shown in Figure 1, and a third circuit utilized the stabilizing circuit shown in the first stage of the cascaded amplifiers in Figure 2. The circuits were designed to operate with a collector voltage of six volts, i. e., between the collector electrode and the emitter electrode, and a collector current of three milliamperes with a 6,000 ohm load line. The source of operating potential was a 22.5 volt battery. The circuit elements utilized were as follows, the values being stated in ohms:

| | Circuit 1 | Circuit 2 (Figure 1) | Circuit 3 (Figure 2) |
|---|---|---|---|
| Collector Electrode Resistor 19 | 4,700 | 4,700 | 6,800 |
| Stabilizing Resistor 23 | | 70,000 | 12,000 |
| Base Resistor | 230,000 | | |
| Emitter Electrode Bias Resistor 33 | | | 470 |
| Base Electrode Resistor 35 | | | 4,700 |

Each of the above circuits and transistors was tested first at room temperature which was assumed to be approximately 20° C., again after an oven heating to 60° C. and again and last after the transistor had been once more cooled down to room temperature. The left hand column represents the voltage drop measured between the collector electrode and the emitter electrode. The remaining columns represent the number of transistors which were measured to have this voltage drop under the conditions shown by the column headings at the top of the table.

*Number of transistors*

| Voltage Emitter-Collector | Circuit 1 | | | Circuit 2 (Figure 1) | | | Circuit 3 (Figure 2) | | |
|---|---|---|---|---|---|---|---|---|---|
| | 20° | 60° | 20° | 20° | 60° | 20° | 20° | 60° | 20° |
| 1 | 5 | 12 | 6 | | | | | | |
| 2 | 2 | 2 | 2 | | 4 | | | | |
| 3 | 1 | 1 | 0 | | 4 | 2 | | | |
| 4 | 0 | 2 | 2 | 5 | 6 | 4 | | | |
| 5 | 3 | 2 | 2 | 2 | 2 | 2 | | 5 | |
| 6 | 3 | 3 | 1 | 7 | 2 | 4 | 10 | 16 | 10 |
| 7 | 2 | 2 | 2 | 3 | 8 | 4 | 16 | 5 | 16 |
| 8 | 1 | 1 | 1 | 8 | | 5 | | | |
| 9 | 0 | 1 | 1 | 1 | | 4 | | | |
| 10 | 2 | | 1 | | | 1 | | | |
| 11 | 3 | | 2 | | | | | | |
| 12 | 2 | | 4 | | | | | | |
| 13 | 1 | | 1 | | | | | | |
| 14 | 1 | | 1 | | | | | | |
| 15 | 0 | | 0 | | | | | | |
| Total | 26 | 26 | 26 | 26 | 26 | 26 | 26 | 26 | 26 |

Examination of these test results shows that circuit 2, which contained the stabilizing circuit illustrated in Figure 1, provided satisfactory operation for each of the twenty-six transistors, whereas some of these same transistors without the stabilization and as shown under the column headed "Circuit 1" operated unsatisfactorily.

It is further apparent that the stabilization provided by circuit 3 (Figure 2) was extremely rigid and would not necessarily be resorted to except in instances where such rigid stabilization is required. The average circuit application of transistors is generally satisfactory with the stabilization provided in the circuit of Figure 1 by the stabilizing impedance connected directly between the collector electrode and the base electrode.

In Figure 2, the output circuit which in Figure 1 was represented by the resistor 21 has been replaced by a second transistor amplifier circuit. It was above stated that the ratio of the collector load impedance should be large relative to the magnitude of the output circuit impedance at signal frequencies, the output impedance of transistor 28 in Figure 2 being provided by coupling condenser 20 and the succeeding transistor 36. This requirement is met in the cascade circuit illustrated in Figure 2. For example, the collector load resistor 19, in one instance, was selected to have a resistance of 7,000 ohms. As is well known, a base input transistor amplifier circuit, such as transistor 36, represents a relatively small impedance in the order of 500 ohms. These values tend to provide maximum direct current stabilization and minimum alternating current degeneration.

The second stage of the cascaded amplifier circuit comprises the transistor 36 having a semi-conductive body 37, an emitter electrode 38, a base electrode 39 and a collector electrode 40, each in contact with the semiconductive body 37. A collector load impedance element represented as a resistor **19*a* is connected between the collector electrode 40 and the negative terminal of the battery 17. The emitter electrode 38 is connected directly to ground, thereby completing the direct current circuit through the transistor 36 and providing direct current energizing potentials for the transistor 36. The base electrode 39 is connected to the collector electrode 31 of the transistor 28 through the coupling capacitor 20. Alternating current signal voltage which is developed in the collector electrode circuit of the transistor 28 is thereby impressed between the base electrode 39** of the transistor and ground.

An output circuit for the second transistor 36 is provided by a coupling capacitor 42 and a load impedance represented as a rectangle 43 containing the legend $Z_L$, which are connected in series arrangement between the collector electrode 40 and ground. Signal voltages which are impressed between the base electrode 39 and ground are, therefore, amplified and developed in amplified form across the output load impedance 43.

A direct current stabilizing circuit which is a further modification of that illustrated in Figure 1 comprises a pair of stabilizing impedance elements illustrated as two resistors 44 and 45 connected in series arrangement between the collector electrode 40 and the base electrode 39 of the transistor 36. A capacitor 46 is connected between the junction of the stabilizing resistors 44 and 45 and the emitter electrode 38.

With the circuit arrangement illustrated in Figure 1, alternating current voltages developed in the collector electrode circuit can be fed back to the input circuit to base electrode 12, and due to the phase relation existing between the collector electrode circuit and the base circuit, these signal voltages may have a degenerative effect upon the signal input to the amplifier circuit. The effect of the capacitor 46 as discussed above, is to provide a bypass between the direct current stabilizing circuit and ground for the alternating current voltages developed in the collector electrode circuit, thereby preventing at least in part the degenerative effect above discussed. It can be seen that the direct current effect of the stabilizing circuit remains the same. The arrangement, therefore, assures that any alternating current voltages normally developed across the resistor 45 will be bypassed to ground and will not modulate the base electrode 39. These voltages will be small if the load impedance $Z_L$ is small.

Figure 3:
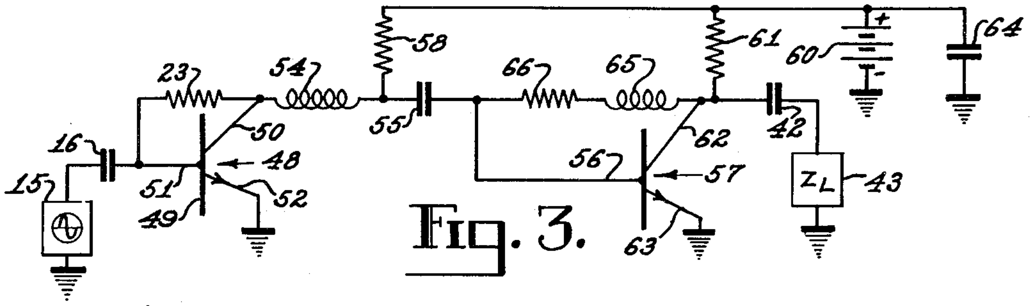
Figure 3 is a schematic circuit diagram of a semi-conductor amplifier circuit illustrating still another embodiment of the present invention as applied, for example, to a radio frequency or intermediate frequency amplifier; and Figures *4a*, *4b* and *4c* are graphs representing typically different operating characteristics of a number of semi-conductor devices.

Referring now to Figure 3 an intermediate or radio frequency amplifier circuit including two transistor amplifier stages connected in cascade is provided with a direct current stabilizing circuit in accordance with the invention, whereby it is operative with transistors having a wide variety of characteristics. In this circuit there is provided a transistor 48 comprising a semi-conductive body 49, a collector electrode 50, a base electrode 51 and an emitter electrode 52 each in contact with the semi-conductive body 49, and having an input circuit substantially identical to that shown in Figure 1. The input circuit includes a coupling capacitor 16 and a source of signals 15 connected between the base electrode 51 and ground. A direct current stabilizing resistor 23 is connected directly between the collector electrode 50 and the base electrode 51. As above described in connection with Figure 1, the emitter electrode 52 is connected directly to ground.

The output circuit of the presently discussed transistor amplifier includes a series resonant circuit consisting of an inductor 54 and a capacitor 55, which are series resonant at the intermediate or radio frequency selected and which are connected between the collector electrode 50 and the base electrode 56 of the second transistor 57. Direct current energizing potentials are provided for the transistor 48 by means of the collector load resistor 58 and the battery 60 connected in series arrangement between the junction of the inductor 54 and the capacitor 55 and ground. A bypass capacitor 64 is connected in shunt with the battery 60.

It is noted that the polarity of the battery 60 is opposite to the polarity of the battery 17 illustrated in Figures 1 and 2. It has been hereinbefore noted that the polarity of the source of direct current energizing potential is dictated by the type of transistor utilized in the circuit. In Figures 1 and 2 the polarity of the battery 17 is proper for use with transistors of the N point contact type or of the P-N-P junction type. Conversely the polarity of the battery 60 as shown in Figure 3 is appropriate for transistors 48 and 57 since they are of the P point contact type or the N-P-N junction type as conventionally indicated by the direction of the arrow associated with the emitter electrodes.

A second collector load impedance represented by a resistor 61 is connected between the collector electrode 62 of the transistor 57 and the positive terminal of the battery 60. The emitter electrode 63 of the transistor 57 is connected directly to ground. An output circuit is represented by a coupling capacitor 42 and a rectangle 43 containing the legend $Z_L$ which are connected in series arrangement between the collector electrode 62 and ground.

A direct current stabilizing and biasing circuit, which is a modification of the circuits described in connection with Figures 1 and 2, comprises an inductor 65 and a resistor 66 connected in series arrangement between the collector electrode 62 and the base electrode 56 of the transistor 57.

As was noted in the above discussion, a pure resistive connection when utilized as the direct current stabilizing circuit will also provide a degenerative path for alternating voltages, which are developed in the collector electrode circuit. The direct current stabilizing circuit as provided by the inductor 65 and the resistor 66 permit changes in the direct current potential of the collector electrode to affect the base electrode current of the transistor. However, the high alternating current impedance of the inductor 65 is operative to effectively isolate the input circuit from the output circuit from an alternating current point of view. Accordingly, this circuit maintains all of the advantages of direct current stabilization and also effectively reduces any alternating current degenerative effects.

The impedance ratio considerations recited in connection with Figure 1 are complied with in the intermediate or radio amplifier stages illustrated in Figure 3. As above noted, the output circuit impedance should be low relative to the collector load impedance at signal frequencies. The impedance offered by the second transistor 57, since base input is used, is normally in the order of 500 ohms as above discussed, and the impedance of the collector load resistor 58 would normally be in the order of 10,000 ohms. Even if the collector load resistor 58 were connected directly to the collector electrode 50, the desired impedance ratio would still be retained at the intermediate or radio frequency. This is due to the fact that the coupling between the collector electrode 50 of the first transistor 48 and the base electrode 56 of the second transistor 57 is provided by means of a series resonant circuit tuned to the desired operating frequency. At the resonant frequency, a series resonant circuit offers a minimum impedance to the circuit to which it is coupled.

Accordingly, it is readily seen that the requirements for direct current stabilization are met. Additionally, however, there is a degenerative alternating current feedback as above discussed which attains maximum effectiveness outside of the selected band of frequencies which the amplifier is designed to amplify. In other words, the signal voltages which appear in the collector electrode circuit are maximum when the collector electrode output circuit offers a maximum impedance. This effectively causes an increase in the feedback to the input of transistor 48 of alternating current voltages whose frequencies lie outside of the frequency band selected by the series resonant tuned circuit 54—55. It is possible to utilize this effect due to the fact that the input circuit of the following transistor amplifier is current operated rather than voltage operated.

A stabilized transistor amplifier circuit which is consistent in operation irrespective of variations in the characteristics of the transistors used therein may be provided in accordance with the invention for various uses. There is economy in the number of circuit elements required. The circuit is capable of satisfactory and predictable operation without adjustment even though transistors having widely varying characteristics are interchangeably used therein.

What is claimed is:

1. A semi-conductor amplifier circuit, comprising in combination, a semi-conductor device including a base electrode, an emitter electrode, and a collector electrode, said device exhibiting the characteristic of providing a signal phase difference of substantially 180° between said collector and base electrodes, means providing a point of reference potential for said circuit, signal input means coupled between said base electrode and said point of reference potential, signal output means coupled between said collector electrode and said point of reference potential and providing a low impedance at signal frequencies, means including a source of direct energizing potential and direct current load resistance means connected in series relation between said collector electrode and said point of reference potential for providing a direct voltage on said collector electrode which is variable in response to variations in direct collector electrode current, stabilizing means including a direct-current conductive impedance element connected between said collector electrode and said base electrode, said direct-current conductive impedance element having resistance of a magnitude greater than the resistance of said load resistance means for providing a direct bias current for said base electrode which effectively is controlled by the direct potential at said collector electrode for stabilizing the operating point of said amplifier circuit, and means providing a low impedance signal path between an intermediate point on said stabilizing means and said emitter electrode.

2. A semi-conductor amplifier circuit, comprising in combination, a semi-conductor device including a base electrode, a collector electrode, and an emitter electrode, said semi-conductor device exhibiting a current gain of less than unity between said emitter and collector electrodes, means providing a point of reference potential for said amplifier circuit, signal input means connected between said base electrode and said point of reference potential, a load impedance element and a source of direct energizing potential connected in series arrangement between said collector electrode and said point of reference potential, a first and a second resistor connected in series arrangement between said collector electrode and said base electrode, the total resistance of said first and second resistors being greater than the resistance of said load impedance element for providing a direct bias current for said base electrode which effectively is controlled by the direct potential at said collector electrode to adjust the operating point of said semi-conductor device, and a signal by-pass capacitor connected between the junction of said first and second resistors and said emitter electrode.

3. A semi-conductor amplifier circuit comprising, in combination, a transistor including base, emitter, and collector electrodes, said transistor providing signal phase reversal between said collector and base electrodes, means connecting said emitter electrode to a point of fixed reference potential in said amplifier circuit, means for applying an input signal between said base and emitter electrodes, an output circuit coupled between said collector and emitter electrodes, means providing a source of direct energizing potential, direct current load resistance means connected in series relation with said energizing means between said collector electrode and said point of reference potential for providing a direct voltage on said collector electrode which is variable in response to variation in direct collector electrode current, and stabilizing means including a direct current conductive impedance element connected between said collector electrode and said base electrode, the magnitudes, nature, and relationships of the impedances of said load resistance means, said stabilizing means, and said transistor being selected so as to provide stabilization of the circuit operation of said amplifier circuit by providing for said base electrode a direct bias current which effectively is controlled by variation of the collector electrode voltage of said transistor, said direct bias current being effective to compensate for collector electrode voltage variation of said transistor to provide operating point stabilization of said transistor despite temperature changes, the interchange of transistors in said amplifier circuit, and the like.

4. A semi-conductor amplifier circuit, comprising, in combination, a transistor including base, emitter, and collector electrodes, said transistor providing signal phase reversal between said collector and base electrodes, means for applying an input signal between said base and emitter electrodes, an output circuit coupled between said collector and emitter electrodes, means including load resistance means and a source of direct energizing potential connected in series relation in the order named between said collector electrode and said emitter electrode for providing a direct voltage on said collector electrode which is variable in response to variations in direct collector electrode current, and stabilizing means including a resistor and an inductor connected in series arrangement between said collector electrode and said base electrode, said resistor having resistance of a magnitude greater than the resistance of said load resistance means, the magnitude, nature, and relationships of the impedances of said load resistance means, said stabilizing means, and said transistor being selected so as to provide stabilization of the circuit operation of said amplifier circuit by providing for said base electrode a direct bias current which effectively is controlled by variation of the collector electrode voltage of said transistor, said direct bias current being effective to compensate for collector electrode voltage variation of said transistor to provide operating point stabilization of said transistor despite temperature changes, the interchange of transistors in said amplifier circuit, and the like.

5. A signal translating circuit comprising, in combination, a transistor having a base electrode, an emitter electrode, and a collector electrode, said transistor providing signal phase reversal between said collector and base electrodes, input circuit means connected with said base and emitter electrodes for applying an input signal between said base and emitter electrodes, output circuit means connected with said collector electrode for deriving an output signal from said collector electrode, means providing a source of direct energizing potential, impedance means connected between said collector electrode and said source of direct energizing potential for providing a resistive direct current collector electrode load for said transistor to provide variation in the collector voltage of said transistor in response to variation in the collector current thereof, and stabilizing means including a direct current conductive path connected between the collector and base electrodes of said transistor, said direct current conductive path including resistance of a greater magnitude than the resistance of said impedance means, the magnitude, nature, and relationships of the impedances of said impedance means, said stabilizing means, and said transistor being selected so as to provide stabilization of the circuit operation of said amplifier circuit by providing for said base electrode a direct bias current which effectively is controlled by variation of the collector electrode voltage of said transistor, said direct bias current being effective to compensate for collector electrode voltage variation of said transistor to provide operating point stabilization of said transistor despite temperature changes, the interchange of transistors in said signal translating circuit, and the like.

6. A signal translating circuit comprising, in combination, a transistor having a base electrode, an emitter electrode, and a collector electrode, said transistor providing signal phase reversal between said collector and base electrodes and having a current gain of less than unity as defined by the ratio of collector current increments to emitter current increments, means for applying an input signal between said base and emitter electrodes, means providing a source of collector biasing voltage for said transistor, impedance means connected between said collector electrode and said source providing a direct current collector electrode load resistance for said transistor to provide a reduction in the direct collector voltage of said transistor in response to an increase in the direct collector current thereof and an increase in the direct collector voltage of said transistor in response to a decrease in the direct collector current thereof, said resistance being greater than the quotient of said direct collector voltage divided by said direct collector current, means for deriving an output signal between said collector electrode and said emitter electrode, and stabilizing means including an impedance element having resistance of a greater magnitude than said load resistance connected between the collector and base electrodes of said transistor, the magnitudes, nature, and relationships of the impedances of said impedance means, said stabilizing means, and said transistor being selected so as to provide stabilization of the circuit operation of said amplifier circuit by providing for said base electrode a direct bias current which effectively is controlled by variation of the collector electrode voltage of said transistor, said direct bias current being effective to compensate for collector electrode voltage variation of said transistor to provide operating point stabilization of said transistor despite temperature changes, the interchange of transistors in said signal translating circuit, and the like.

7. A signal translating circuit, comprising, in combination, a transistor having a base, an emitter, and a collector electrode, said transistor providing signal phase reversal between said collector and base electrodes, means providing a point of reference potential for said circuit, signal input means for applying an input signal between said base electrode and said point of reference potential, signal output means for deriving an output signal between said collector electrode and said point of reference potential, means coupled with said collector electrode providing a source of direct collector biasing voltage and a resistive direct current collector electrode load for said transistor, said load providing variation in the direct collector voltage of said transistor in response to variation in the collector current thereof, the direct voltage provided across said resistive load in response to collector current flow therethrough being of a larger magnitude than said direct collector voltage, and stabilizing means providing resistance of a larger magnitude than the resistance of said load connected between said collector and base electrodes, the magnitude, nature, and relationships of said load, said stabilizing means, and said transistor being selected so as to provide stabilization of the circuit operation of said amplifier circuit by providing for said base electrode a direct bias current which effectively is controlled by variation of the collector electrode voltage of said transistor, said direct bias current being effective to compensate for collector electrode voltage variation of said transistor to provide operating point stabilization of said transistor despite temperature changes, the interchange of transistors in said signal translating circuit, and the like.

(References on following page)

References Cited in the file of this patent

UNITED STATES PATENTS

| | | |
|---|---|---|
| 2,517,960 | Barney et al. | Aug. 8, 1950 |
| 2,533,001 | Eberhard | Dec. 5, 1950 |

OTHER REFERENCES

Barton: Abstract of application Serial No. 78,268, pub. October 28, 1952, 663 o. g. 1220, 1221.